United States Patent [19]

Kawano

[11] Patent Number: 5,153,792
[45] Date of Patent: Oct. 6, 1992

[54] RECORDING AND REPORDUCING APPARATUS

[75] Inventor: Kenji Kawano, Tokyo, Japan

[73] Assignee: Canon Kabushiki Kaisha, Tokyo, Japan

[21] Appl. No.: 814,076

[22] Filed: Dec. 24, 1991

Related U.S. Application Data

[63] Continuation of Ser. No. 425,470, Oct. 23, 1989, abandoned.

[30] Foreign Application Priority Data

Oct. 27, 1988 [JP] Japan .................................. 63-272543
Oct. 31, 1988 [JP] Japan .................................. 63-276875

[51] Int. Cl.$^5$ ........................................... G11B 17/035
[52] U.S. Cl. ............................. 360/99.01; 360/99.02; 360/99.06; 360/99.07
[58] Field of Search .... 360/99.01, 99.02, 99.05–99.07, 360/105, 130.2, 130.34, 133

[56] References Cited

U.S. PATENT DOCUMENTS

| | | | |
|---|---|---|---|
| 4,504,879 | 3/1985 | Toldi et al. | 360/105 |
| 4,710,831 | 12/1987 | Nishimura | 360/99.01 |
| 4,734,809 | 3/1988 | Inuma et al. | 360/99.05 X |
| 4,736,357 | 4/1988 | Uehara et al. | 360/99.02 X |
| 4,787,005 | 11/1988 | Tezuka et al. | 360/130.2 |
| 4,805,052 | 2/1989 | Nishijima | 360/99.06 |
| 4,816,944 | 3/1989 | Tezuka | 360/99.06 X |

Primary Examiner—John H. Wolff
Attorney, Agent, or Firm—Robin, Blecker, Daley & Driscoll

[57] ABSTRACT

A recording and reproducing apparatus comprising a conveying mechanism for moving a recording medium to a loading position where recording and reproduction can be effected and for ejecting it therefrom; a recording and reproducing head for performing recording and reproduction on and from the recording medium; a stabilizing member arranged in such a manner as to be vertically movable with respect to the recording medium and adapted to stabilize the contact between the recording medium and the recording and reproducing head; and a control mechanism for controlling the operation of the conveying mechanism and of the stabilizing member. When ejecting the recording medium from the loading position, the control mechanism causes the stabilizing member to be separated from the recording medium prior to the ejecting movement made by the conveying mechanism. Further, at least three reference surfaces for positional adjustment are formed on the stabilizing member.

22 Claims, 12 Drawing Sheets

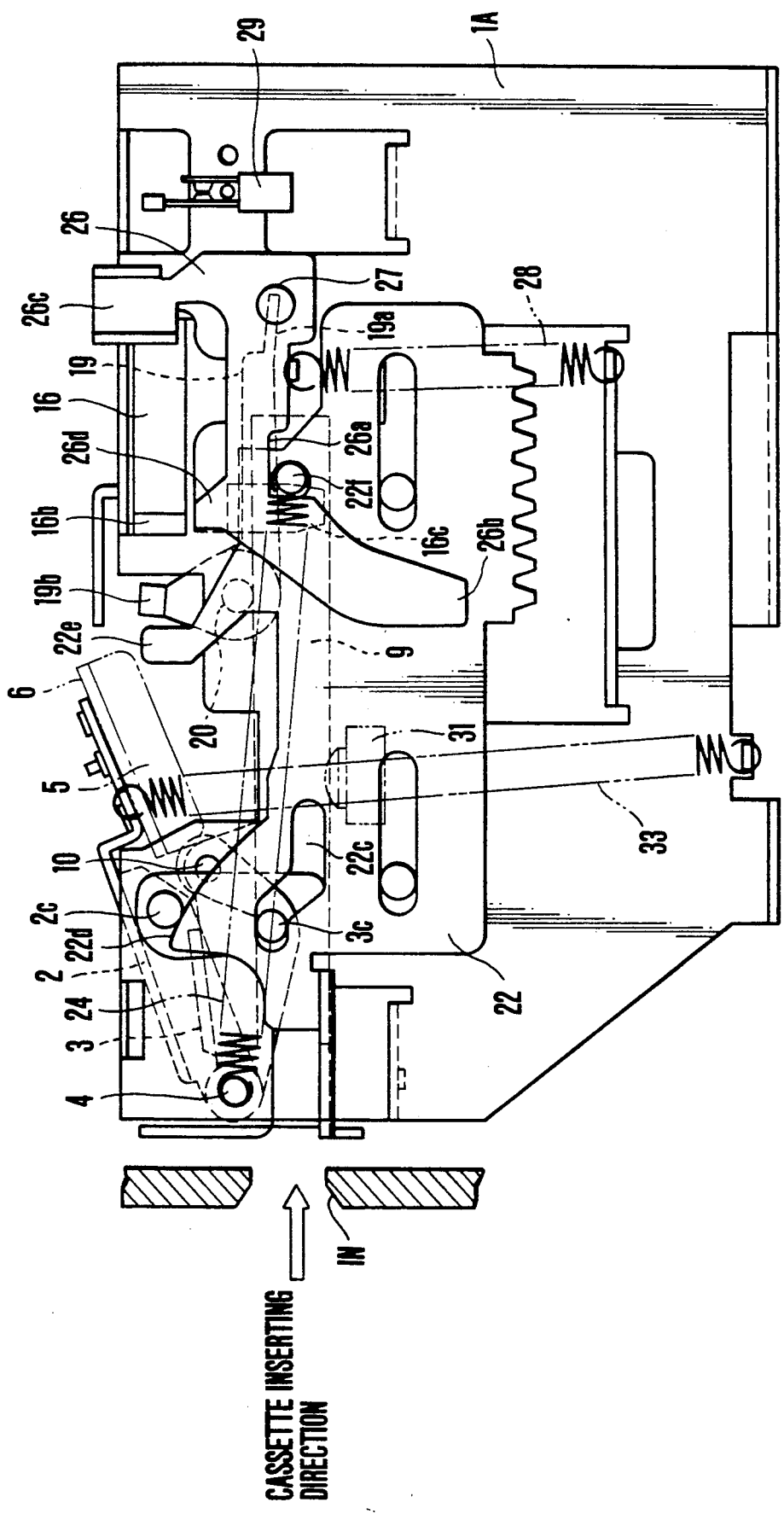

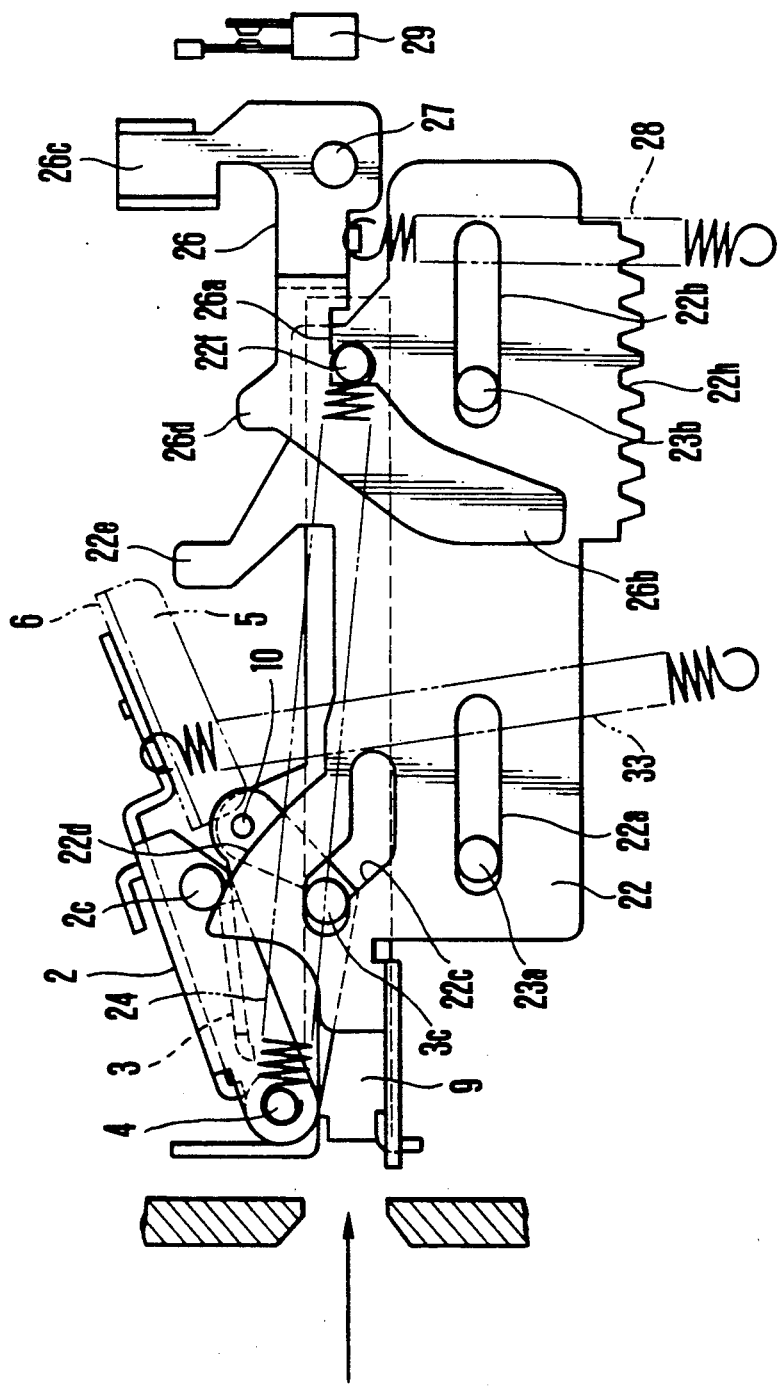

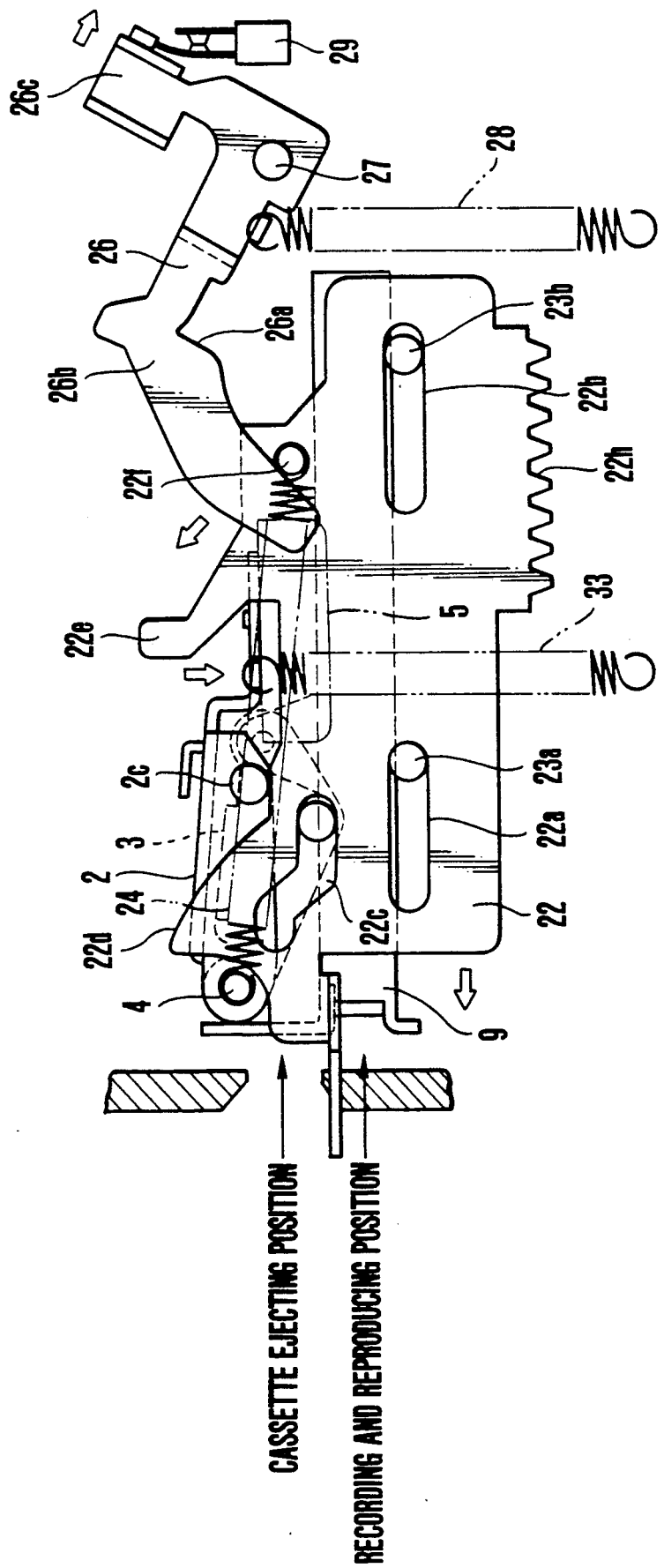

CASSETTE INSERTING DIRECTION

CASSETTE INSERTING DIRECTION

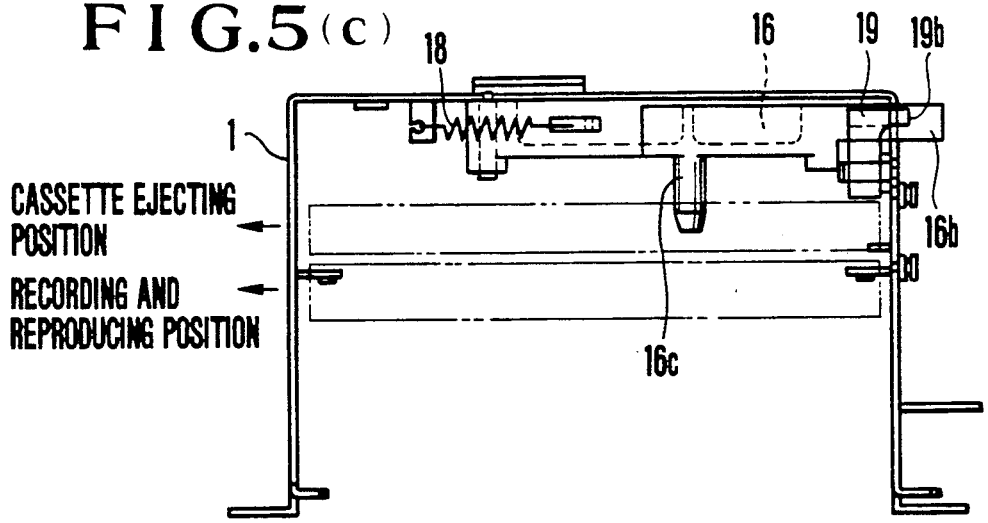
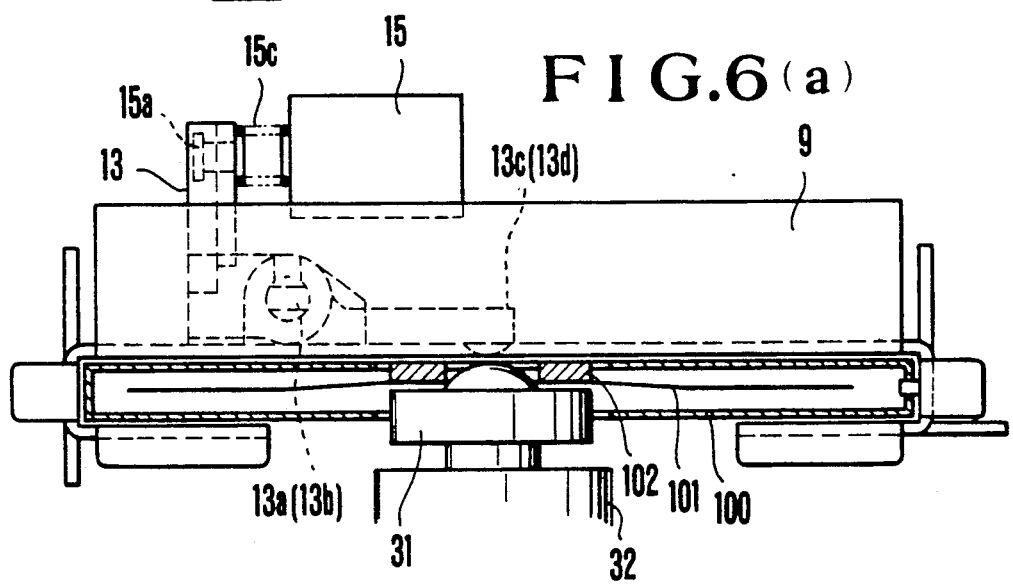
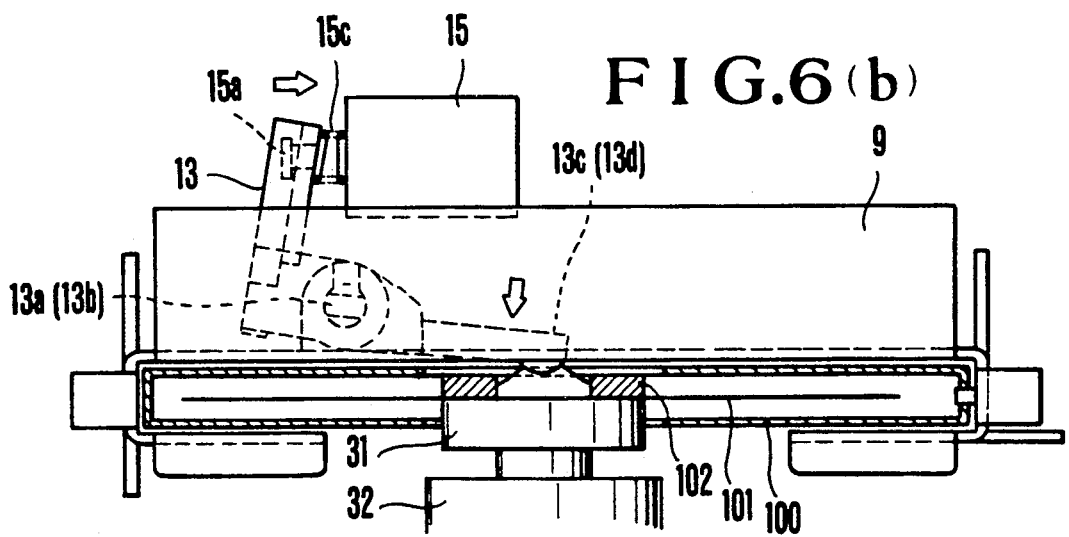

RECORDING AND REPORDUCING APPARATUS

This is a continuation under 37 CFR 1.62 of prior application Ser. No. 425,470, filed Oct. 23, 1989, now abandoned.

BACKGROUND OF THE INVENTION

1. Field of the Invention

This invention relates to a recording and reproducing apparatus, and more specifically, to a recording medium loading mechanism for bringing a recording medium to the recording or reproducing position.

2. Description of the Related Art

Lately, video apparatuses have made rapid progress. Above all, the electronic still video camera, which is capable of recording still images, sound, data or the like on a rotating magnetic disk and immediately effecting the reproduction, transmission, printing, etc., of what is thus recorded, has attracted considerable attention as the video apparatus which is to take the place of the conventional silver-halide camera.

As will be described in the description of the preferred embodiments of this invention, the electronic still video camera uses a magnetic disk sheet called a video floppy disk which is rotated at high speed. A magnetic head is brought into contact with this rotating disk, thereby effecting recording and reproduction.

Thus, the contact between the magnetic head and the magnetic disk must be constantly kept stable with high accuracy. In view of this, a stabilizing member is arranged on the opposite side of the magnetic head with respect to the magnetic disk and in close proximity to the head. This stabilizing member is adapted to utilize the airflow caused by the rotation of the magnetic disk for generating a pressure (hereinafter referred to as "positive pressure") for pressing the magnetic disk against the magnetic head, thereby stabilizing the touch of the magnetic head.

An apparatus of this type is further equipped with a loading mechanism which is adapted, when loading the magnetic disk on the rotating spindle, to simultaneously move the stabilizing member to the disk surface.

However, the following problem has been found in the above-described conventional apparatus: since the operation of moving the stabilizing member to the disk surface is performed simultaneously with the loading (or ejecting) of the magnetic disk serving as the recording medium, any dispersion in the quality of the parts constituting the mechanism or in that of the assembling work will cause the stabilizing member to exert force, while it is ascending together with the magnetic disk, against the magnetic disk before the magnetic disk has been completely loaded. Such premature application of force is apt to cause movements leading to damage to the recording surface of the magnetic disk. For example, the stabilizing member may deform the magnetic disk, or it may be brought into contact with the magnetic disk at a deviated position. Such an accident is most likely to occur when the magnetic disk is ejected before the stabilizing member has been separated from it. Any flaw in the magnetic disk constitutes a serious problem since it will deteriorate the accuracy of its rotation, thereby causing errors in the writing and reading of information.

Next, the system of supporting the stabilizing member in the above conventional apparatus will be discussed. The stabilizing member utilizes the airflow generated by the high-speed rotation of the magnetic disk so as to form an air film for pressing the magnetic disk against the magnetic head, thereby allowing it to run in a stable manner and providing a satisfactory head touch. Formed on that surface of this stabilizing member which faces the magnetic disk are projections, between which the magnetic head is placed. Defined between these projections is a recess or groove for allowing the magnetic head to move in the width direction in which the magnetic-head tracks are arranged. These projections help to stabilize the magnetic disk when it is being rotated.

The position of the magnetic head relative to these projections must be controlled with high accuracy within a range of several $\mu$m. Accordingly, the position of protruding parts for mounting and adjusting this stabilizing member must also be controlled with similar accuracy with respect to the above-mentioned projections. In view of this, these protruding parts are equipped with an adjusting mechanism using screws or the like. When adjusting, those ridge sections of the projections which are nearer to the disk, for example, the ridge sections 252a and 252b in FIG. 8, which will be referred to below, are brought into contact with a measuring instrument, thereby adjusting the positions of these projections with respect to the head.

The above conventional example, however, involves the following problems: when the distance between the two projections is relatively small, it is very difficult to adjust with high accuracy the height of the protruding parts for mounting the stabilizing member by using, for example, the ridges of the projections as a reference. Moreover, a slight torsion in the two ridges will cause the stabilizing member to become unstable at the time of adjusting; the height of the protruding parts will also change if there is any dispersion in its mounting. As a result, the process of adjusting the head touch when incorporating the stabilizing member into the associated casing takes an excessively long time, making it very difficult to reduce labor and costs.

In addition, if the adjustment is repeated a number of times, the ridge sections, which are relatively weak, may be deformed or damaged. Thus, the above conventional system of adjustment is not desirable for a head-supporting mechanism, which requires high accuracy.

Stabilizing members of the type described above are disclosed, for example, in U.S. Pat. Nos. 4,787,005, 4,734,809, and 4,736,357, as well as in U.S. patent application Ser. No. 838,901 filed on Mar. 12, 1986 and 843,740 filed on Mar. 25, 1986.

SUMMARY OF THE INVENTION

This invention aims at eliminating the abovementioned problems experienced with the prior art apparatuses. It is accordingly a first object of this invention to provide a recording and reproducing apparatus which is capable of smoothly performing the attachment and detachment of the stabilizing member to and from the recording medium when loading and ejecting the recording medium.

A second object of this invention is to provide a recording and reproducing apparatus which is capable of allowing the stabilizing member to be reliably separated from the recording medium prior to the movement of the recording medium when it is loaded and ejected, thereby reliably preventing the recording medium from being damaged.

In accordance with a preferred embodiment of this invention, these objects are achieved by a recording and reproducing apparatus comprising: conveying means for conveying a recording medium to a loading position where recording or reproduction can be effected and for ejecting the recording medium from this loading position; a recording and reproducing head for recording and reproducing information on and from the recording medium in the loading position; a stabilizing member arranged in such a manner as to be capable of ascending and descending with respect to the recording medium and adapted to stabilize the contact between the recording medium and the recording and reproducing head; and control means for controlling the operation of the conveying means and of the stabilizing member; the control means being adapted, when ejecting the recording medium from the loading position, to separate the stabilizing member from the recording medium prior to the ejecting movement made by the conveying means, thus controlling the timing of ejecting the magnetic disk in such a manner that the stabilizing member never fails to be separated from the magnetic disk prior to the start of the disk ejecting movement.

A third object of this invention is to provide a recording and reproducing apparatus in which the stabilizing member is positioned with high accuracy with respect to the recording medium and the head.

A fourth object of this invention is to provide a recording and reproducing apparatus which allows the position of the stabilizing member to be adjusted with ease.

In accordance with a preferred embodiment of this invention, these objects are attained by a recording and reproducing apparatus of the type equipped with a stabilizing member which is arranged at a predetermined position where it faces a magnetic head through a recording medium and which serves to stabilize the contact between the magnetic head and the recording medium, the position of the stabilizing member being controlled with respect to the magnetic head by means of at least three position-adjusting members arranged in mounting sections provided in the apparatus, and at least three reference surfaces for positional adjustment being formed in the end sections on that surface of the stabilizing member which controls the recording medium.

Other objects and features of this invention will become apparent from the following description and the attached drawings.

BRIEF DESCRIPTION OF THE DRAWINGS

FIG. 2(a) is a left-hand side view of the apparatus in the unloading condition where no cassette is loaded;

FIG. 2(b) is a left-hand side view of the same, showing the essential part thereof;

FIG. 3(b) is a left-hand side view of the same, showing the essential part thereof;

FIG. 5(c) is a front view of the essential part of the disk-ejecting mechanism as seen on the side of the cassette inlet;

FIGS. 6(a) and 6(b) are front views illustrating the operation of the disk-pressing mechanism as seen on the side of the cassette inlet;

DETAILED DESCRIPTION OF THE PREFERRED EMBODIMENTS

An embodiment of the recording and reproducing apparatus of this invention will now be described in detail with reference to the accompanying drawings.

Figure 7A:
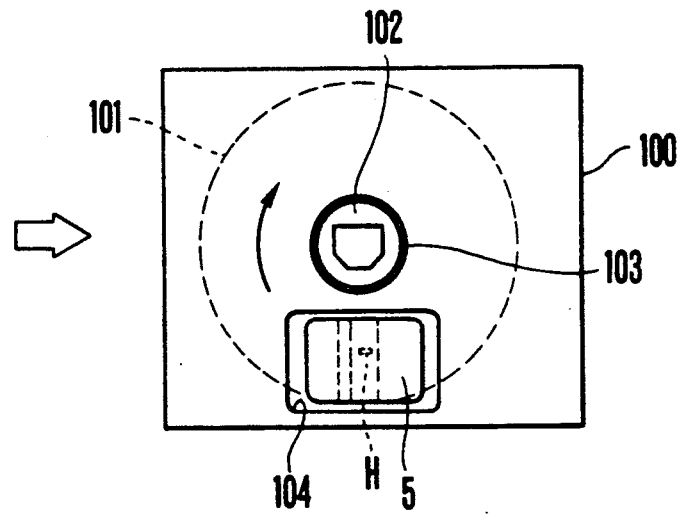
FIGS. 7(a) to 7(c) illustrate the operation of the stabilizing plate.

FIG. 7(a) is a plan view showing an example of the recording medium used in the apparatus of this invention. The reference numeral 100 indicates a cassette in which a magnetic disk 101 is rotatably lodged. A center core 102 which is to be fitted onto a spindle in the apparatus is provided in the central section of the magnetic disk 101, and is exposed to the exterior through an opening 103 at the center of the cassette 100. Provided on both sides of the cassette 100 are openings 104, into which a magnetic head H and a stabilizing plate 5, which will be described below, are inserted so that they may gain access to the magnetic disk 101. These openings 104 are normally closed by shutters (not shown) and are opened when the cassette is loaded into the apparatus.

Figure 1:
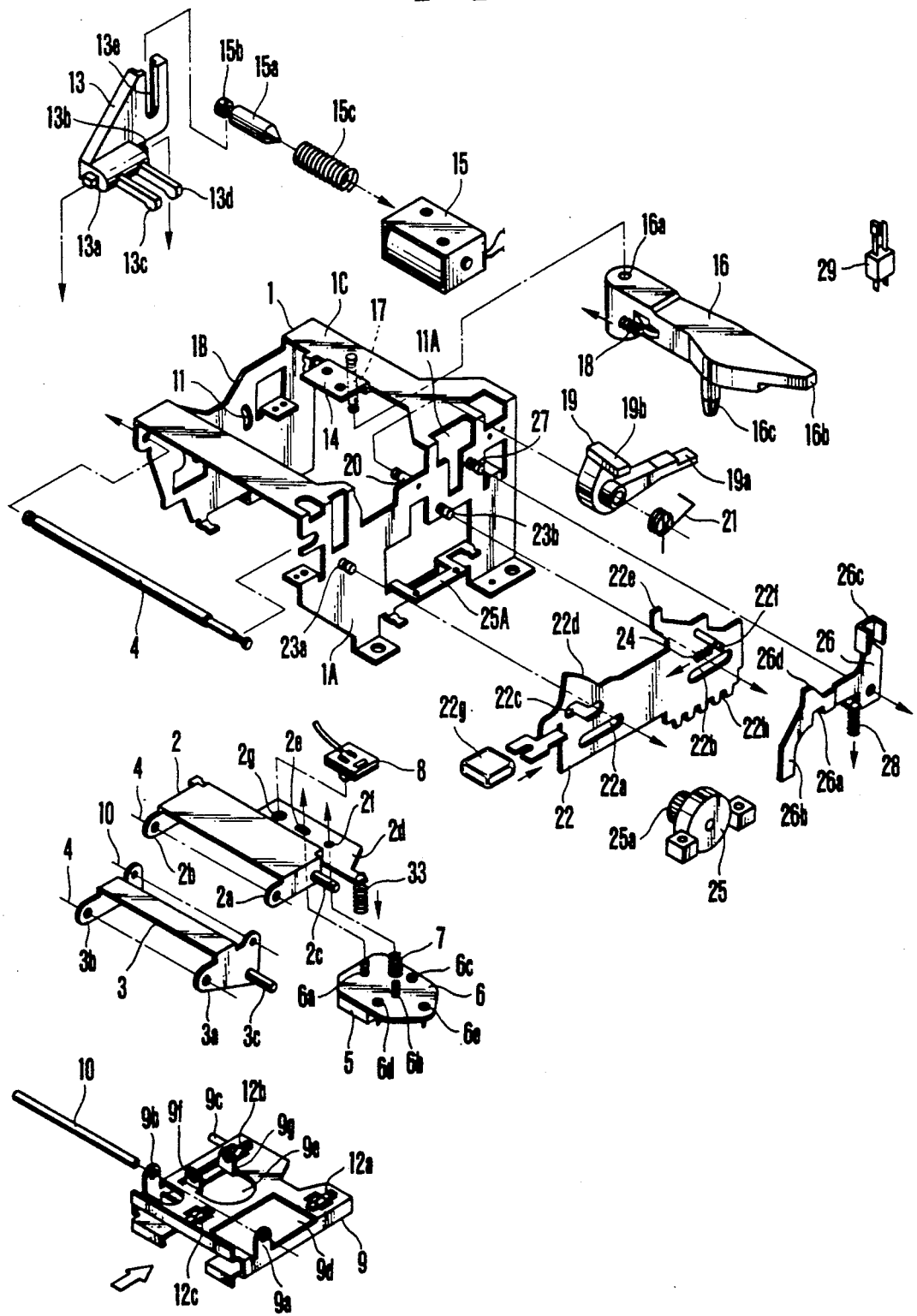
FIG. 1 is an exploded perspective view of the apparatus of this invention.

FIG. 1 is an exploded perspective view of a recording and reproducing apparatus in accordance with this invention. In the drawing, the reference numeral 1 indicates a frame which is composed of side plates 1A, 1B, and a top plate 1C connecting them together. This frame 1 is fixed in a predetermined position in the apparatus. Rotatably attached to the front section of the frame 1 are a support member 2 for supporting a stabilizing plate 5, which will be described below and a holder-support member 3 for supporting a holder 9, which will be described below. The support member 2 and the holder-support member 3 can rotate around a shaft 4 which is inserted into support ears 2a, 2b and 3a, 3b of the support member 2 and the holder-support member 3, respectively, and which is supported between the side plates 1A and 1B of the frame. The support member 2 is constantly biased clockwise by a spring 33. The support member 2 has on one of its side surfaces an engaging pin 2c, and, on its free-end side a mounting section 2d for mounting the stabilizing plate 5. The stabilizing plate 5 is inserted into the cassette 100 through the opening 104 on the opposite side of the magnetic head and serves to stabilize the contact between the disk and the head. The stabilizing plate 5 is fixed to a support plate 6 having pins 6a and 6b, which are inserted into holes 2e and 2f of the mounting section 2d, respectively, in such a manner so as to be vertically movable within a predetermined range and as not to be allowed to come off. The stabilizing plate 5 is constantly biased toward the disk by a coil spring 7 arranged around the pin 6b and placed between the mounting section 2d and the support plate 6. Position-adjusting screws 6c, 6d and 6e are screwed into the support plate 6 and extend downwards therethrough. These screws are adapted to abut against a positioning section (not shown) in the chassis when the stabilizing plate 5 is lowered by the support member 2, thereby accurately positioning the stabilizing plate 5. Attached to a hole 2g adjacent to the hole 2e of the mounting section 2d is a PG coil 8 for measuring the rotation phase of the disk by detecting a PG pin embedded in the center core 102 of the disk. The position of this PG coil 8 is so determined that it is brought into close proximity to the center core 102 when the stabilizing plate 5 is lowered onto the disk 101.

The reference numeral 9 indicates a holder for loading the cassette, which is inserted into the apparatus through its front-side surface, into a predetermined position where recording or reproduction can be effected. This holder 9 has a substantially box-like configuration so that it can hold the cassette and is rotatably mounted on the free-end side surface of the holder-support member 3 by means of support ears 9a and 9b on both sides of its upper surface and a shaft 10. At the same time, a pin 9c provided in the rear section of the right-hand side surface of the holder 9 is engaged with an arc-like guide groove 11 formed in the right-hand side plate 1B of the frame 1, thus supporting the holder 9 at three points. Further, an engaging pin 3c for allowing the holder-support member 3 to rotate is provided on the left-hand side surface of the holder-support member 3. Thus, by rotating the holder-support member 3, the holder 9 can be moved between the cassette-attaching/detaching position situated relatively higher and the cassette-loading position situated relatively lower. Formed on the upper surface of the holder 9 are an opening 9d for allowing the insertion of the stabilizing plate 5, a hole 9e for allowing the operation of the PG coil 8 and of a disk-pressing member 13, which will be described below, and support ears 9f and 9g for mounting the disk pressing member 13. Further, attached to the holder 9 are positioning plate springs 12a to 12c protruding into the holder 9 and adapted to press the cassette downwards.

The above-mentioned disk-pressing member 13 is rotatably mounted on the holder 9 by means of its engaging projections 13a, 13b and the support ears 9f, 9g on the upper surface of the holder 9. Formed at one end of this disk-pressing member 13, in a position opposed to the center core 102 of the disk, are arms 13c and 13d serving as the disk-pressing section which extends clear of the disk-rotating spindle and the PG coil 8. These arms 13c and 13d are adapted to press the upper surface of the center core 102 of the disk at two points. Formed at the other end of the disk-pressing member 13 is an engagement groove 13e adapted to be constantly engaged with the small diameter section 15b of a rod 15a belonging to a plunger 15. This engagement groove 13e is made relatively long so that the rod 15a of the plunger 15 will not come off as a result of the vertical movement of the holder 9. By supplying electricity to the plunger 15, the rod 15a is drawn in and the disk-pressing member 13 is rotated clockwise, thereby causing the arms 13c and 13d, which serve as the disk-pressing section, to press the center core of the disk against the spindle. A coil spring 15c arranged around the rod 15a serves to restore the disk-pressing member 13 and the rod 15a to their original positions.

The reference numeral 16 indicates a cassette ejecting lever for ejecting the cassette lodged in the holder 9 to the exterior through the cassette inlet provided in the front surface of the apparatus. The cassette ejecting lever 16 has at one end a hole 16a, through which an axle 17 provided on the back surface of the top plate 1C of the frame 1 is inserted, thereby rotatably supporting the cassette ejecting lever 16. At the same time, the cassette ejecting lever 16 is biased clockwise by means of a spring 18 provided between it and the frame 1. Provided at the free end of the cassette ejecting lever 16 is an engaging section 16b protruding sideways through a cutout section 11A provided in the left-hand side plate 1A of the frame 1. Formed on the bottom surface of the cassette ejecting lever 16 is a cassette pressing section 16c adapted to be pressed against the cassette in the holder 9 in order to eject it. As will be appreciated from the front view shown in FIG. 5(C), this cassette pressing section 16c is directed to the inner space of the holder 9.

The reference numeral 19 indicates an ejection-lock lever for locking the cassette ejecting lever 16 in its rear position when it is pressed in the cassette-insertion direction against the spring 18. This ejection-lock lever 19 is rotatably mounted on an axle 20 on the inner surface of the left-hand plate 1A of the frame 1 and is biased counterclockwise, as indicated by the arrow, by means of a coil spring 21. Formed at one end of this ejection-lock lever 19 is a lock step 19a adapted to lock the cassette ejecting lever 16 in the position where it has been rotated in the cassette-insertion direction. Formed at the other end of the ejection-lock lever 19 is an engaging section 19b protruding beyond the left-hand plate 1A of the frame 1 and engaging with a slide plate 22, which will be described below.

The above-mentioned slide plate 22 is adapted to control the support member 2, the holder-support member 3, the ejection-lock lever 19, etc., in order to control the operation of loading the cassette to the recording or reproducing position and of ejecting it therefrom. This slide plate 22 has elongated holes 22a and 22b, which are respectively engaged with pins 23a and 23b provided on the left-hand side plate 1A of the frame 1 so that it can slide in the longitudinal direction. The slide plate 22 is normally biased forwards, i.e., in the direction reverse to the cassette-insertion direction, by a spring 24. Formed in the slide plate 22 are a stepped engaging groove 22c with which the engaging pin 3c of the holder support member 3 is constantly engaged, a cam section 22d against which the engaging pin 2c is constantly pressed, an engaging tongue 22e adapted to engage with the engaging section 19b and to operate it, and an engaging pin 22f engaging with a slide-lock lever 26, which will be described below. Further, an operation finger-grip 22g is attached to the front-end section of the slide plate 22. Formed on the lower edge of the slide plate 22 is a rack 22h which is engaged with a pinion 25a belonging to a damping mechanism 25 mounted on a mounting section 25A provided on the left-hand frame plate 1A. The pinion 25a of this damping mechanism 25, which is well known in itself, is caused to gently rotate by oil or air, thereby preventing the slide plate 22 from making a jerky movement and softening the movement of the different parts.

The above-mentioned slide-lock lever 26 serves to lock the slide plate 22 in the position where it has been forced rearwards in the apparatus. This slide-lock lever 26 is rotatably mounted on an axle 27 on the left-hand side plate 1A of the frame 1 and is biased counterclockwise by a spring 28. Formed at one end of the slide-lock lever 26 is an engaging recess 26a adapted to engage with the engaging pin 22f of the slide plate 22 so as to lock the slide plate 22 in its rear position, an engaging arm 26b connected to the engaging recess 26a and adapted to hold the slide-lock lever 26 in the position in which it has been rotated clockwise against the resilient force of a spring 28, and an operating part 26c which can be engaged with the engaging section 16b of the cassette ejecting lever 16 and which is adapted to operate a loading-detection switch 29 attached to the left-hand side plate 1A of the frame at a position near its rear end. Further, formed in the upper edge section of the engaging arm 26b is a locking projection 26d which faces the engaging section 16b of the cassette ejecting lever 16, which is moved to the side of the cassette inlet when the cassette is not attached to the apparatus (the cassette-ejection condition). This locking projection 26d serves to prevent the lock between the slide-lock lever 26 and slide-plate 22 from being released by a vibration, a shock from falling or the like in the condition in which the cassette is not attached, as shown in FIG. 2(a), which would erroneously cause the holder 9 to be lowered to the recording and reproducing position.

The operation of the recording and reproducing apparatus of this invention, which has the construction described above, will now be described systematically.

FIGS. 2(a) and 2(b) are left-hand side views showing the apparatus in the condition in which the cassette is not attached yet, and, in which, consequentially, the cassette can be inserted into the apparatus through the front surface thereof (the unloaded condition). To facilitate the comprehension of FIG. 2(a), the essential part thereof is extracted and shown in FIG. 2(b).

In the condition shown, the slide plate 22 has been slided rearwards, i.e., to the right as seen in the drawing; the slide pin 22f is locked in the locking recess 26a of the slide-lock lever 26, thereby locking the slide plate 22 in the position shown. Since in this condition the locking projection 26d of the slide-lock lever 26 is in the position opposed to the engaging section 16b of the cassette ejecting lever 16, the engaging section 16b of the cassette ejecting lever 16 is not rotated even when the slide-lock lever 26 receives a force in the rotating direction as a result of a vibration or the like, which helps to prevent the lock of the slide plate 22 from being released by mistake. When the slide-lock lever 26 is in this position, the loading-detection switch 29 is in the OFF condition.

The holder support member 3 is rotated counterclockwise around the axle 4 by positioning its engaging pin 3c in the upper step of the stepped engaging groove 22c of the slide plate 22. The holder 9 is held horizontally in its upper position, i.e., in the position where it is opposed to the cassette inlet IN formed in the outer casing. Thus, in this condition, the cassette can be inserted from the exterior into the apparatus.

The stabilizing-plate support member 2 is rotated counterclockwise around the axle 4 by raising its engaging pin 2c by means of the cam section 22d of the slide plate 22, bringing the stabilizing plate 5 and the PG coil 8 to their positions above the holder 9. The plunger 15 is in the unexcited condition, and the disk-pressing member 13 is rotated counterclockwise by the coil spring 15c arranged around the rod 15a of the plunger 15, its arms 13c and 13d being in a position spaced from the center core of the disk.

Figure 5A:
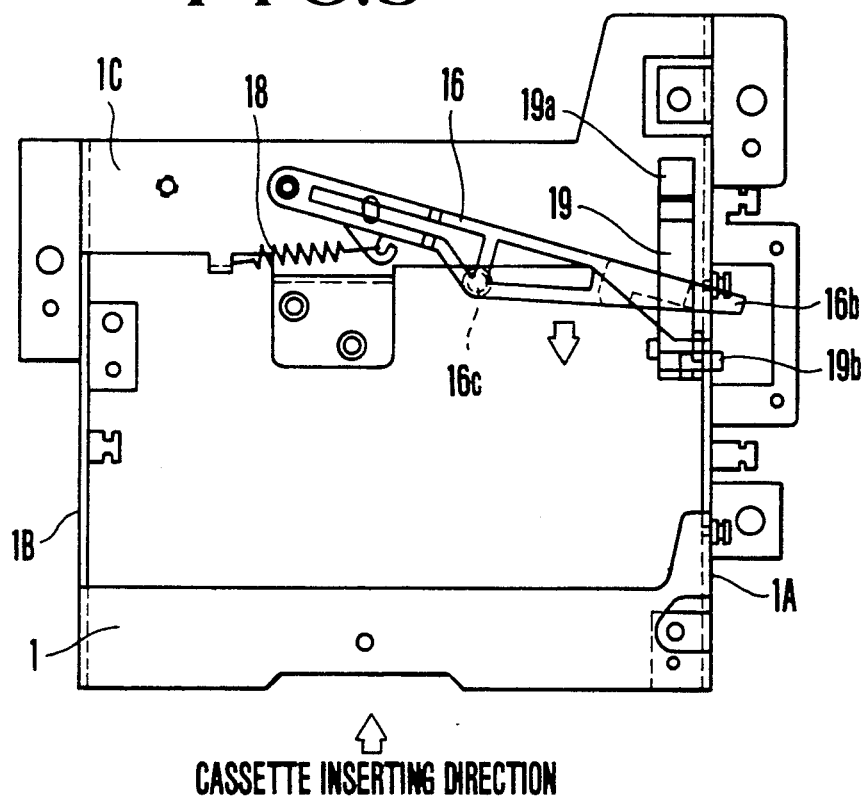
FIGS. 5(a) and 5(b) are plan views illustrating the construction and operation of the disk-ejecting mechanism, showing it in the state where a cassette has been ejected and the state where it has been inserted, respectively.

As will be appreciated by also referring to FIG. 5(a), the cassette ejecting lever 16 is released from the lock effected by the ejection-lock lever 19, and is rotated in the cassette ejecting direction, i.e., clockwise, by the resilient force of the spring 18. The amount of this forward rotation of the cassette ejecting lever 6 is limited by its engaging section 16b, which abuts against the inner edge of the cutout section 11A of the left-hand side plate 1A of the frame 1.

Further, the coil spring 21 causes that arm of the ejection-lock lever 19 having the locking step 19a to be pressed against the cassette ejecting lever 16.

Figure 3A:
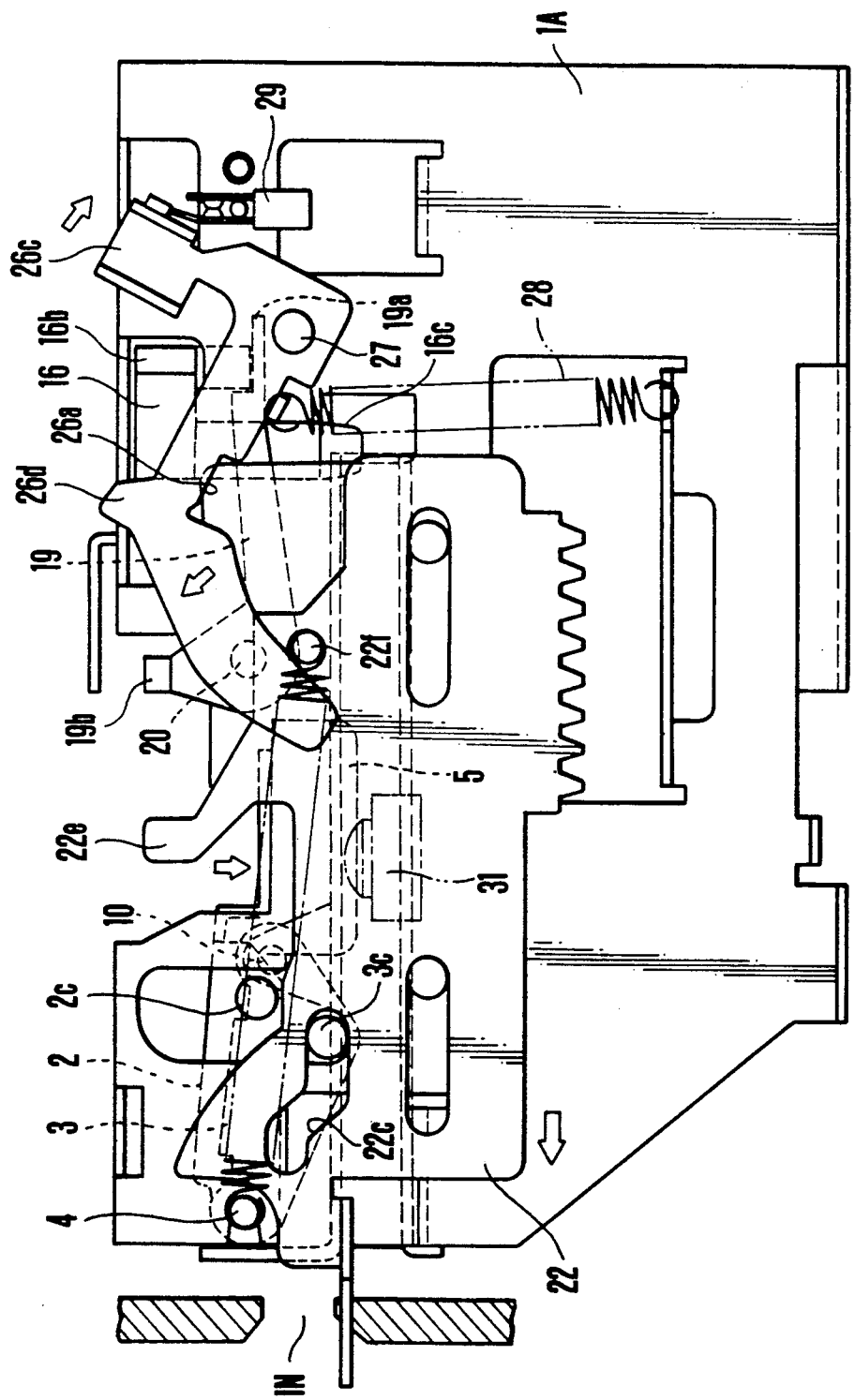
FIG. 3(a) is a left-hand side view of the apparatus in the loading condition where a cassette is loaded.
Figure 5B:
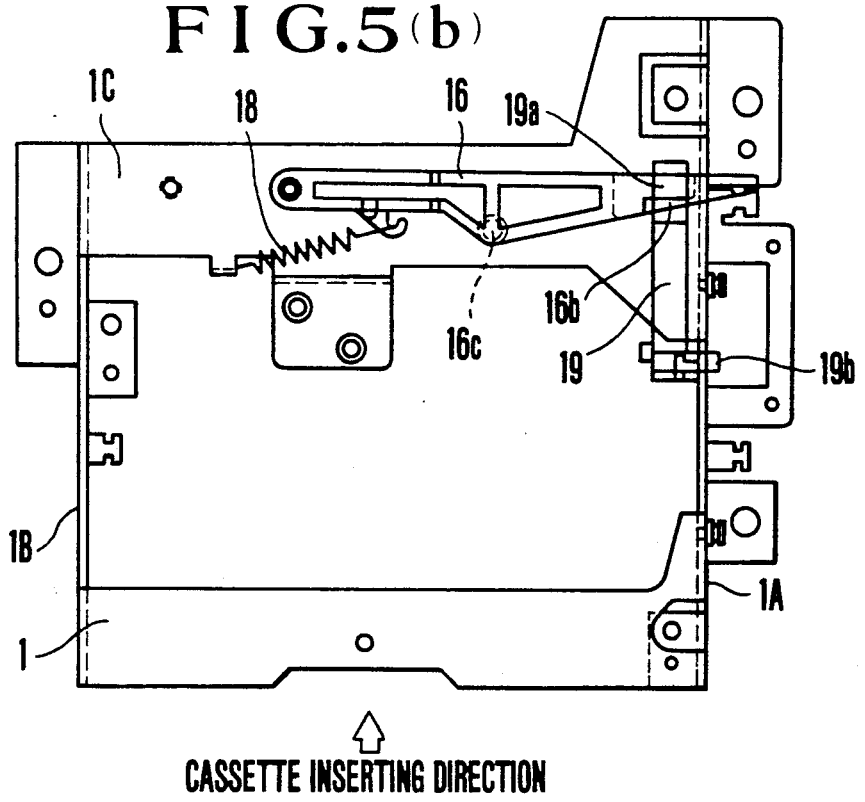

When, in the condition described above, the cassette is inserted into the apparatus through the cassette inlet IN, the cassette is inserted into the holder 9 after passing through the cassette inlet IN. During its insertion into the holder 9, the cassette abuts against the cassette-pressing section 16c of the cassette ejecting lever 16. Afterwards, the cassette is inserted while pressing the cassette ejecting lever 16 against the resilient force of the spring 18. As shown in FIG. 3(a), the front surface of the cassette ejecting lever 16 is locked, when it has passed the locking step 19a of the ejection-lock lever 19, by this locking step 19a, which is effected by the counterclockwise rotation of the ejection-lock lever 19 caused by the spring 21. Accordingly, the cassette is not ejected out of the holder 9 even if it is released from the hand. FIG. 5(b) shows this condition.

The rotation of the cassette ejecting lever 16 effected by the insertion of the cassette causes its engaging section 16b to move in the cassette inserting direction, i.e., to the right as seen in FIG. 2(a), thereby pressing the operating part 26c of the slide-lock lever 26 and rotating this slide-lock lever 26 clockwise. Accordingly, the engaging pin 22f of the slide plate 22 is released from the engaging recess 26a of the slide lock lever 26, and the slide plate 22 is slided forwards, i.e., in the direction reverse to the cassette inserting direction (to the left as seen in the drawing), by the resilient force of the spring 24, reaching the position shown in FIG. 3(a).

As a result of the movement of the slide plate 22 to the left, the engaging pin 3c of the holder support member 3 moves to the lower step of the stepped engaging groove 22c, which causes the holder support member 3 to rotate clockwise. As a result, the holder 9 is lowered to a predetermined recording and reproducing position situated below, and the center core 102 of the disk is fitted onto the spindle 31.

At the same time, the engaging pin 2c of the stabilizing-plate support member 2 is moved downwards along the cam section 22d of the slide plate 22, which causes the stabilizing-plate support member 2 to rotate clockwise by the resilient force of the spring 30, causing the support plate 6, on which the stabilizing plate 5 is mounted, to rotate downwards. This causes the stabilizing plate 5 to be inserted through the opening 9d of the holder 9, and is moved onto the disk through the opening 104 of the cassette 100.

As a result of the above-described cassette-loading operation, the loaded condition shown in FIGS. 3(a) and 3(b) is attained. FIG. 3(b) is merely an extraction of the essential part of FIG. 3(a). It is intended to help the comprehension of FIG. 3(a), and no particular meaning is attached thereto.

In the cassette loading operation described above, the slide plate 22, after being released from the lock effected by the slide-lock lever 26, raises the engaging arm 26b of the slide-lock lever 26 with its engaging pin 22f, causing it to rotate clockwise and to close the loading-detection switch 29 with its operating part 26c. The closed condition of this switch 29 is retained until the cassette has been ejected. By thus closing the switch 29, the control system (not shown) of the apparatus is made ready to operate, and the control operation is conducted afterwards.

By closing this loading-detection switch 29, the plunger 15 is excited, which causes the disk-pressing member 13 to be operated. FIGS. 6(a) and 6(b) are front views of the apparatus, as seen on the cassette insertion side, illustrating the operation of the disk-pressing member 13, effected together with the above-described cassette loading operation. In the drawings, the reference numeral 31 indicates a spindle which is directly connected to the rotating shaft of a disk-rotating motor 32 and to which the center core 102 of the disk is attached so as retain the disk on it.

In the condition shown in FIG. 6(a), the holder 9 has loaded the cassette onto the recording and reproducing position; the loading-detection switch 29 is in the condition just before it is closed by the operating part 26c of the slide-lock lever 26, which means the plunger 15 has not been excited yet. Accordingly, the disk pressing member 13 is rotated counterclockwise by the coil spring 15c, retaining its arms 13c and 13b at a position spaced from the center core 102 of the magnetic disk 101.

When, in this condition, the loading-detection switch 29 is closed by the slide lock lever 26 after the completion of the loading, the plunger 15 is excited by a control means (not shown), and, as shown in FIG. 6(b), the disk-pressing member 13 is rotated clockwise, pressing the center core 102 of the disk against the spindle 31 by means of its arms 13c, 13d, which serve as the disk-pressing section. The spindle 31 comprises a positioning surface adapted to receive the lower surface of the center core and to position it, and a shaft section adapted to be fitted into the central hole of the center core 102. This allows the center core to be reliably fitted onto the spindle 31. The disk-pressing member 13 is formed of a material such as plastic, and, since the disk-pressing section 13c, 13d itself is resilient, damage to the equipment can be avoided even when there is over-stroke or the like, which provides safety.

Figure 7B:
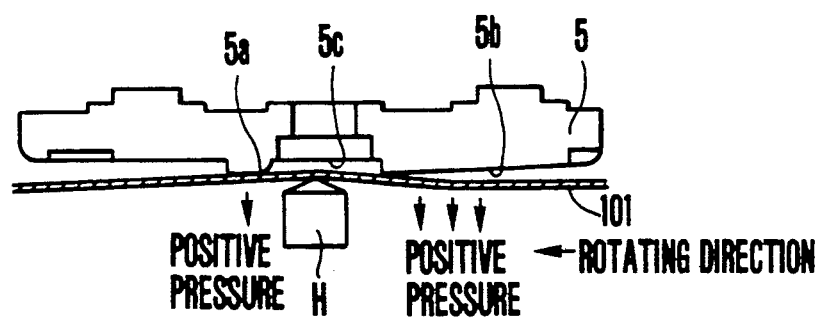

In the condition in which the cassette has been loaded onto a predetermined position, the stabilizing plate 5 is inserted through one of the openings 104 of the cassette 100, as shown in FIG. 7(a), and is positioned in close proximity to the magnetic disk 101; the magnetic head H is inserted through the opening 104 on the opposite side of the cassette and performs recording and reproduction on and from the magnetic disk 101. The stabilizing plate 5 is brought into contact with the rotating magnetic disk 101, and controls the air pressure in such a manner that a positive pressure, i.e., a pressure for pressing the magnetic disk 101 against the magnetic head H, is generated as the disk is rotated at high speed. This operation will be described in more detail. FIG. 7(b) is a side sectional view showing the positional relationship between the stabilizing plate 5, the magnetic disk 101, and the magnetic head H in the recording and reproducing position. As is well known, a positive pressure for pressing the disk 101 against the magnetic head H is generated on an inclined surface where the gap between the recording surface of the disk and the opposed surface of the stabilizing plate 5 is narrower on the downstream side than on the upstream side with respect to the rotating direction of the disk; on a surface with the reversed inclination, a negative pressure is generated, which causes the disk to be attracted by the stabilizing plate. Thus, in this invention, a positive pressure is generated on the inclined surfaces 5a and 5b, pressing the magnetic disk 101 against the magnetic head H, thereby stabilizing the contact between the disk and the head. Formed in the stabilizing plate 5 at the position facing the magnetic head H is a recess 5c for allowing the head to move over the entire range of its movement. Since the pressure in this recess is kept at atmospheric pressure, no positive pressure is generated therein.

Suppose, when bringing the stabilizing plate 5 into contact with the magnetic disk or separating it therefrom, the stabilizing plate is caused to make a parallel movement as in prior art apparatuses. When, in that case, the gap between the stabilizing plate 5 and the disk surface is narrower on the upstream side than on the downstream side with respect to the disk rotating direction, the rotation of the disk will generate a negative pressure since the stabilizing plate itself is movably mounted on the support plate for its positioning. That will cause the magnetic disk to be attracted to the surface of the stabilizing plate 5, which will lead to damage to the disk recording surface and to the stabilizing plate, their dropout, and so on.

Figure 7C:
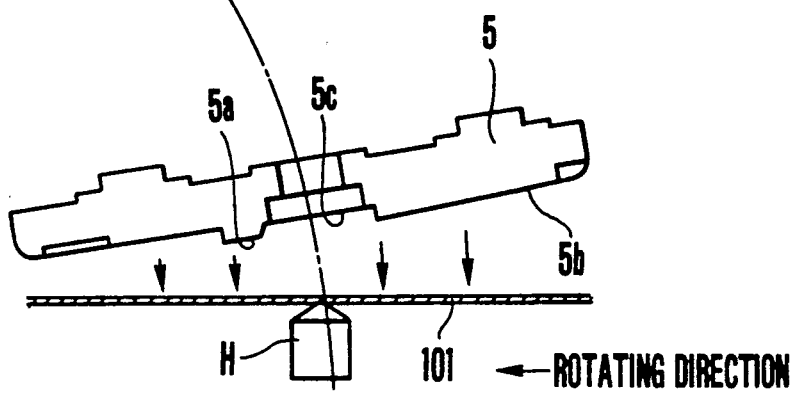

In accordance with this invention, the stabilizing plate 5 is, as shown in FIG. 7(c), brought into contact with and separated from the disk surface as it is rotated by the stabilizing-plate support member 2. At the same time, the axis of this rotation, i.e., the rotating shaft of the stabilizing-plate support member 2 (shaft 4), is positioned on the downstream side with respect to the disk rotating direction, so that the stabilizing plate 5 is brought into contact with and separated from the disk surface, with the gap between it and the disk surface being constantly narrower on the downstream side than on the upstream side, thus maintaining the positional relationship for generating the so-called positive pressure. Thus, no negative pressure is generated during the relative movement of the stabilizing plate and the disk as in conventional apparatuses.

The timing for the descent of the holder 9 to the recording and reproducing position situated below and that for the descent of the stabilizing plate 5 to the disk surface, effected during the above-described cassette loading operation, will now be described with reference to FIG. 4.

As described above, the vertical movement of the holder 9 is controlled by means of the holder support member 3 and the stepped engaging groove 22c of the slide plate 22, as well as of the stabilizing-plate support member 2 and the cam section 22d of the slide plate 22.

Figure 4:
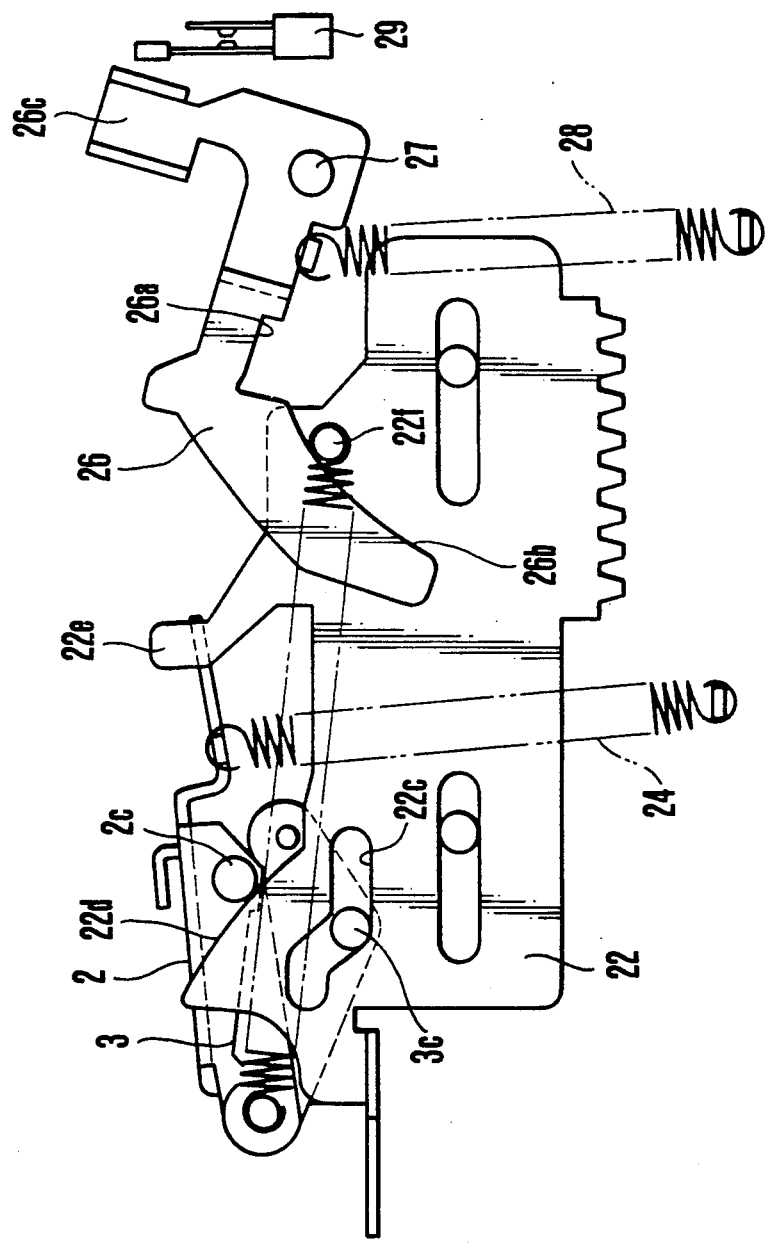
FIG. 4 is a partial side view showing the operational timing for the holder and the stabilizing plate in an intermediate state between those shown in FIGS. 2(a), 2(b) and 3(a), 3(b)

As shown in FIG. 4, when the engaging pin 3c of the holder support member 3 has moved to the lower step of the stepped engaging groove 22c as a result of the sliding movement of the slide plate 22 and the holder 9 has been lowered, the stabilizing-plate support member 2 is still moving along the cam section 22d and is spaced from the disk surface; after this, the stabilizing plate 5 is lowered through that movement of the slide plate 22 corresponding to the horizontal section of the engaging groove 22c. When the holder 9 has been lowered to bring the cassette to the recording and reproducing position, and the position of the magnetic disc has been substantially settled, the stabilizing plate 5 is brought into contact with the disk.

Accordingly, also in the cassette ejecting operation to be described below, the stabilizing plate 5 is first separated from the disk surface through the movement to the right (as seen in the drawing) of the slide plate 22, and then the holder 9 is raised to the cassette attaching-/detaching position. Accordingly, the magnetic disk is prevented from being raised before the stabilizing plate 5 has been raised, thus avoiding deformation of and damage to the disk and providing a high level of safety and reliability. Further, the configuration of the engaging arm 26b of the slide-lock lever 26 is so determined that the loading-detection switch 29 is released into the OFF condition when the cassette is still in the loading condition and when the stabilizing plate 5 has been separated from the surface of the magnetic disk.

The operation of inserting the cassette through the cassette inlet IN and loading it onto a predetermined position in the apparatus is as described above. The operation of ejecting the cassette out of the apparatus will now be described.

The cassette ejecting operation is started when, in the loading condition shown in FIGS. 3(a) and 3(b), the slide plate 22 is slided rearwards, i.e., to the right as seen in the drawings, by manipulating the operating fingergrip 22g attached to the front-end section, on the side of the cassette inlet, of the slide plate 22.

First, while the engaging pin 3c of the holder support member 2 is moving along the horizontal lower section of the engaging groove 22c of the slide plate 22, the holder 9 is retained in the lowered position (loading condition); meanwhile, the stabilizing-plate support member 2 is swung upwards by the cam section 2d, and the stabilizing plate 5 is separated from the disk surface, which causes the loading-detection switch 29 to be released, thereby stopping the supply of electricity to the different parts of the apparatus.

Further, by forcing the slide plate 22 rearwards, the engaging pin 3c of the holder support member 3 is moved to the upper step section of the engaging groove 22c, thereby raising the holder 3 to the cassette attaching/detaching position (the unloading position) opposed to the cassette inlet IN.

On the other hand, as a result of the sliding movement of this slide plate 22, its engaging part 22e is pressed against the engaging section 19b of the ejection-lock lever 19, which causes the ejection-lock lever 19 to rotate clockwise, thereby releasing the engagement between the locking step 19a at its end and the front edge of the cassette ejecting lever 16, and the cassette ejecting lever 16 is rotated clockwise by the spring 18, from the position of FIG. 5(b) to that of FIG. 5(a), and ejects the cassette in the holder 9 to the exterior for a predetermined distance through the cassette inlet IN.

Then, with the rearward sliding movement of the slide plate 22, the slide-lock lever 26 is rotated clockwise by the spring 28, and, when the slide plate 22 has reached a predetermined rearward-force-in position, the engaging pin 22f is locked by the locking recess 26a of the slide-lock lever 26, and its rearward-force-in position is locked, thus restoring the apparatus to the condition shown in FIG. 2(a) and FIG. 5(a).

As described above, the recording and reproducing apparatus of this invention is so designed that, when ejecting the magnetic disk serving as the recording medium out of the recording and reproducing position, the stabilizing member is separated from the magnetic disk prior to the magnetic disk ejecting movement, thereby avoiding damage to the disk due to dispersion in the mechanism.

This arrangement helps to improve the safety and reliability of a recording and reproducing apparatus and is advantageous, in particular, in an apparatus for performing high-density recording.

Next, a second embodiment of this invention, in which the means for supporting and adjusting the stabilizing member has been improved, will be described with reference to FIGS. 8 to 14.

Figure 12:
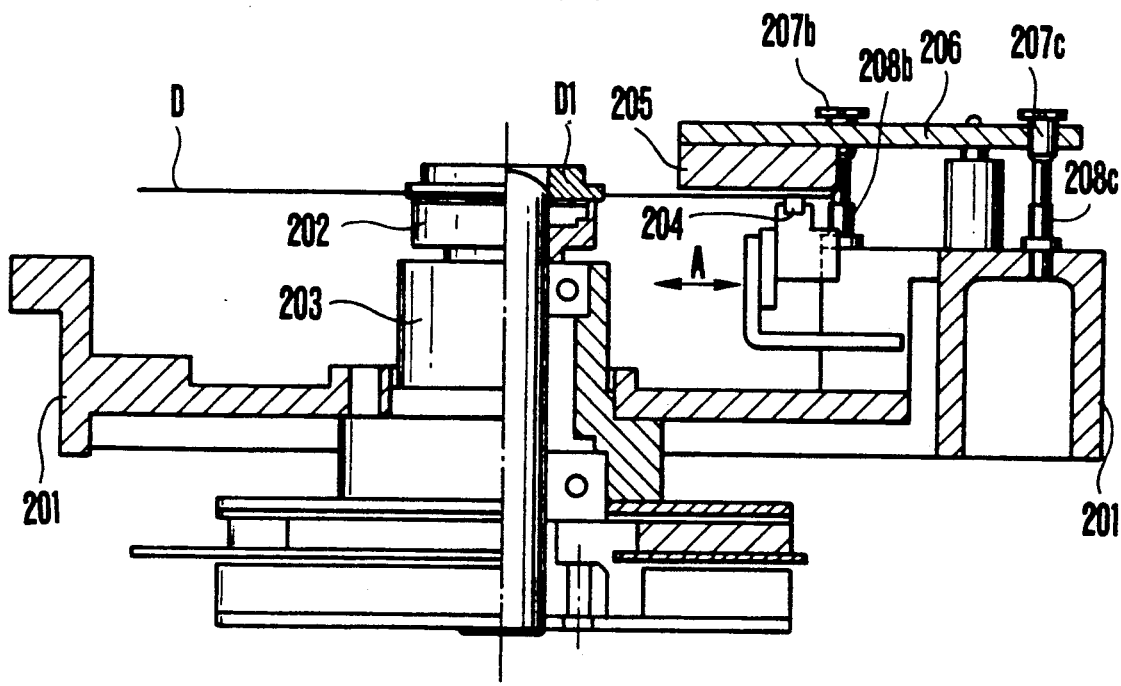
FIG. 12 is a schematic view of the recording apparatus.

FIG. 12 is a side view of a recording and reproducing apparatus in accordance with this embodiment. Attached to a chassis 201 is a spindle motor 203 on which a spindle 202 is mounted. The spindle 202 is adapted to engage with the center core D1 of a flexible magnetic disk D and to rotate it. A magnetic head 204 adapted to be brought into contact with the magnetic disk D from below is supported by a head carriage (not shown), and is arranged in such a manner as to be movable in the radial direction of the magnetic disk D, as indicated by the arrow A. This arrangement allows change of the recording tracks to which access is to be gained and which is among a plurality of concentric circular tracks on the magnetic disk D.

A stabilizing member 205 for stabilizing the contact between the magnetic head 204 or, more correctly, the head gap thereof and the magnetic disk D is attached to the chassis 201 through the intermediary of a support plate 206, at a position opposed to the magnetic head 204 with the magnetic disk D lying therebetween.

Figure 8:
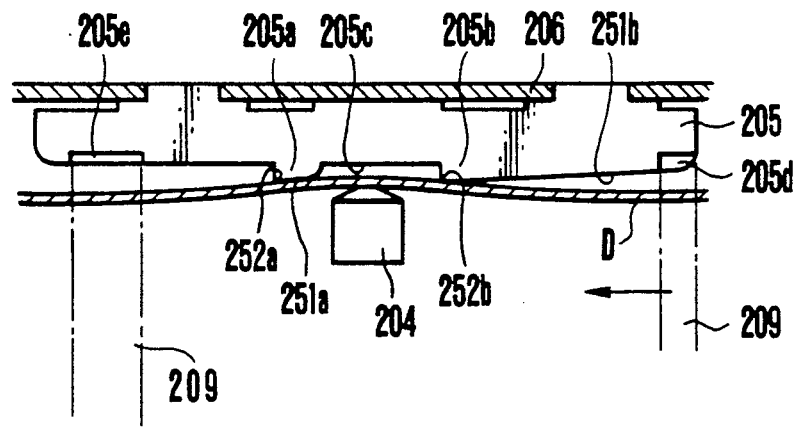
FIG. 8 is a sectional view of the stabilizing member, the recording head and the recording medium in the second embodiment of this invention.

As will be appreciated from FIG. 8, projections 205a and 205b are formed on this stabilizing member 205, on both sides of the head moving path at a position opposed to the magnetic head 204. Formed on those surfaces of the linear projections opposed to the magnetic disk are inclined surfaces 251a and 251b for generating the pressure for pressing the magnetic disk against the magnetic head. The section which is between the projections 205a and 205b and which faces the magnetic head 204 is formed as a groove 205c for allowing the head to move. Thus, the magnetic disk D is controlled by the respective ridges 252a and 252b of the projections 205a and 205b formed on the stabilizing member 205, and abuts against the magnetic head at a most suitable position.

The stabilizing member 205 is fixed to the support plate 206 by a well-known means such as screws or adhesive.

The stabilizing member 205 is positioned with respect to the magnetic head 204 by adjusting the mounting position of the support plate 206 with respect to the chassis 201.

Figure 9:
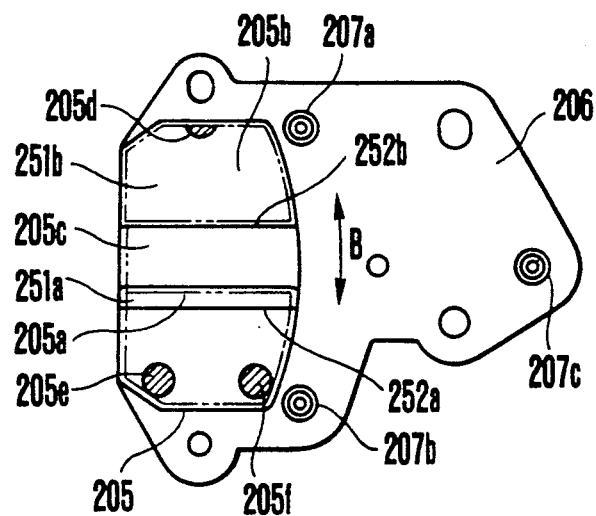
FIG. 9 is a bottom view of the stabilizing member.
Figure 10:
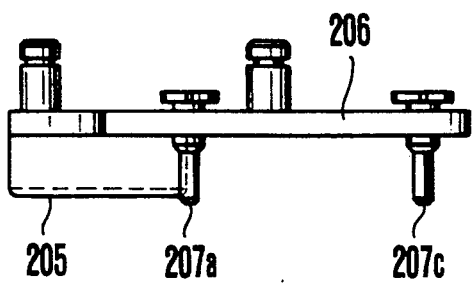
FIG. 10 is a side view of the stabilizing member.
Figure 11:
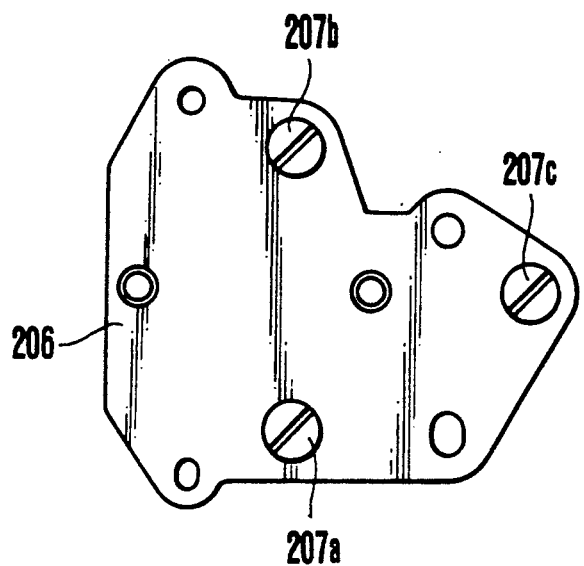
FIG. 11 is a top view of the stabilizing member.

FIGS. 9 to 11 are a bottom view, a side view, and a top view, respectively, illustrating the construction of the support plate 206 and of the stabilizing member 205. As will be appreciated from these drawings, the support plate 206 is equipped with positioning protrusions 207a, 207b and 207c which extend downwards from its bottom surface facing the chassis 201 and which can be adjusted by means of respective screw sections thereof engaged with the support plate.

The mounting position of the support plate 6 with respect to the magnetic head 204 is set by engaging these positioning protrusions 702a, 702b and 702c with positioning joggles 208a, 208b and 208c. In order to determine the position of the stabilizing member 205, a tool 209 for positional measurement is brought into contact with positioning reference surfaces 205d, 205e and 205f; in this condition, the distance between each of these reference surfaces and the magnetic head is measured by a well-known optical detecting means or a magnetic detecting means, and the screws constituting the protrusions 207a, 207b and 207c are adjusted so as to adjust their positions with respect to the magnetic head 204.

Here, the following fact deserves attention: the ridges 252a and 252b of the stabilizing member 205 are not used as the reference surfaces for positioning; in view of the considerably high machining accuracy of the entire stabilizing member 205, the reference surfaces 205d, 205e and 205f are used for the purpose. These reference surfaces 205d, 205e and 205f are situated as far from the ridges 252a and 252b as possible, at positions near the edges of the stabilizing member 205. The ridges 252a and 252b are subject to damage. Moreover, the distance between them is rather small, so that torsion, inclination, positional deviation in the height direction, etc. are apt to occur there. In accordance with this invention, the length of the stabilizing member 205 is utilized to the utmost, and three-point adjustment is performed arranging the reference surfaces, to which the tool 209 is applied when measuring, at positions in the end areas, where they are spaced as far as possible from each other. Thanks to this arrangement, the errors generated in the ridge sections in the middle of the stabilizing member can be substantially diminished, thereby allowing the adjusting operation to be performed in a stable manner and with high accuracy.

Figure 13:
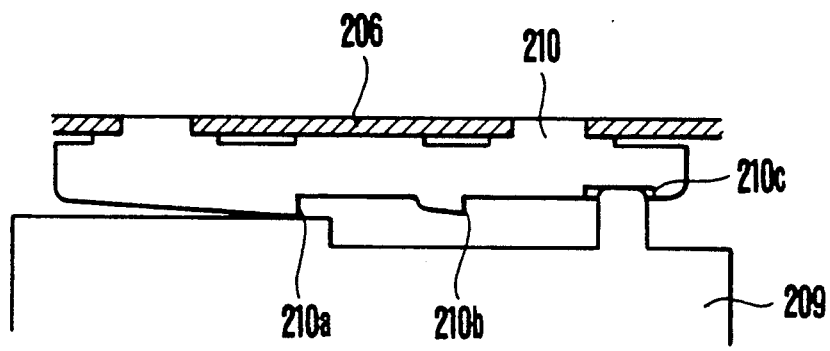
FIG. 13 is side view of the stabilizing member in the third embodiment.
Figure 14:
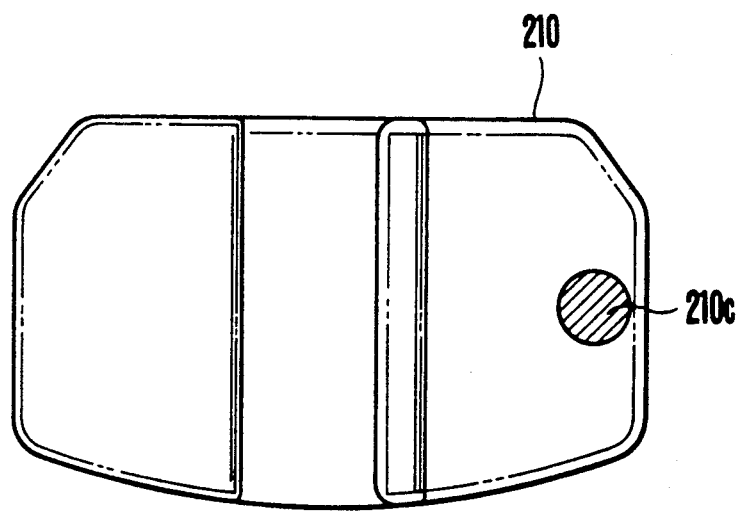
FIG. 14 is a bottom view of the stabilizing member in the third embodiment.

FIGS. 13 and 14 show a third embodiment of this invention. In this embodiment, only one of the two ridges 210a and 210b of a stabilizing member 210 for controlling the magnetic disk D is used as the reference. At the same time, a reference surface for measurement 210c is provided on the side of one of the ridges. This arrangement also allows the distance between the measurement points to be made relatively long, thus providing a similar effect to that of the above-described second embodiment.

Thanks to this arrangement, the load on the ridge portions can be reduced. In addition, since it uses an actually used ridge portion as the reference surface, the third embodiment makes it possible to realize a more accurate adjustment.

As for the other components of the stabilizing member 210 of this embodiment, they are identical to those of the stabilizing member 205, so a description of them will be omitted.

As described above, in accordance with this invention, at least three measurement-reference surfaces are provided on that surface of the stabilizing member opposed to the recording medium; these reference surfaces are situated in the outer areas with respect to the two ridges provided on this surface of the stabilizing member. This arrangement allows the position of the stabilizing member supported with respect to the chassis to be adjusted with high accuracy, thereby making it possible to constantly secure a satisfactory head touch, and to reduce the labor and costs of the operation.

What is claimed is:

1. A recording and reproducing apparatus for recording on and reproducing from a recording medium in a loading position comprising:
   (A) loading means for loading the recording medium to the loading position where recording and reproduction can be effected in said apparatus and for ejecting the recording medium which is loaded at the loading position out of said apparatus;
   (B) a recording and reproducing head for performing recording on or reproduction from the recording medium in the loading position;
   (C) a stabilizing member arranged in such a manner as to be vertically movable with respect to the recording medium and adapted to stabilize the contact between the recording medium and said recording and reproducing head, at least three position-adjusting members arranged in mounting sections provided in said apparatus and adapted to control the position of said stabilizing member with respect to said recording and reproducing head; and at least three position-adjusting reference surfaces formed in the end sections of a surface of said stabilizing member which controls the recording medium; and
   (D) control means for controlling the operation of said loading means and of said stabilizing member; said control means being designed such that, when the recording medium is ejected from the loading position, said stabilizing member is caused to be separated from the recording medium prior to the ejecting movement made by said loading means.

2. A recording and reproducing apparatus according to claim 1, wherein said loading means includes:
   (A) holder means which is movable between a first position where the recording medium can be attached and detached from said holder means and a second position where said recording medium can be positioned in the loading position; and
   (B) guide means for causing said holder means to make a substantially parallel movement between said first position and said second position.

3. A recording and reproducing apparatus according to claim 2, wherein said control means includes:
   (A) lock means adapted to lock said holder means in said first position and to be caused to release a lock condition by the insertion of the recording medium into said holder means; and
   (B) a slide member biased in such a manner as to urge said holder means toward said second position and adapted to move said holder means to said second position in synchronism with the release of the lock condition of said lock means.

4. A recording and reproducing apparatus according to claim 3, wherein said stabilizing member is supported by a support member which is raised and lowered with respect to the recording medium by said slide member.

5. A recording and reproducing apparatus according to claim 3, wherein said holder means and said stabilizing member are respectively engaged with a cam section of said slide member, the relative operational timing between said holder means and said stabilizing member being controlled by said cam section.

6. A recording and reproducing apparatus according to claim 3, wherein said lock means locks said slide member.

7. A recording and reproducing apparatus according to claim 6, further comprising lock-release-prohibiting means for retaining said lock means in a lock-releaseprohibiting condition until the recording medium in inserted into said holder means.

8. A recording and reproducing apparatus according to claim 7, wherein said lock-release-prohibiting means is caused to release the lock-release-prohibiting condition by inserting the recording medium into said holder means for a predetermined distance.

9. A recording and reproducing apparatus according to claim 1, wherein the apparatus is adapted to record on and reproduce from a flexible disc-shaped magnetic recording medium.

10. A recording and reproducing apparatus according to claim 9, further comprising drive means for rotating the recording medium in the loading position.

11. A recording and reproducing apparatus according to claim 10, wherein said stabilizing member is arranged in a position where it faces said recording and reproducing head through the intermediary of the recording medium.

12. A recording and reproducing apparatus according to claim 11, wherein said stabilizing member is placed in close proximity to the recording medium and is adapted to stabilize the rotation of the recording medium by means of an air film generated between said stabilizing member and the recording medium rotated by said drive means and to press the recording medium against said recording and reproducing head.

13. A loading apparatus for loading a recording medium to a loading position comprising:
 (A) loading means for loading the recording medium to the loading position where recording and reproduction can be effected in said apparatus and for ejecting the recording medium which is loaded at the loading position out of said apparatus;
 (B) drive means for driving the recording medium when it has been conveyed to the loading position;
 (C) stabilizing means for stabilizing the drive condition of the recording medium; at least three position-adjusting members arranged in mounting sections provided in said apparatus and adapted to control the position of said stabilizing member with respect to a magnetic head; and at least three position-adjusting reference surfaces formed in the end sections of a surface of said stabilizing member which controls the recording medium; and
 (D) control means for bringing said stabilizing means into an operating condition or a non-operating condition in synchronism with the movement of said loading means,
wherein said loading means is so designed that, when the recording medium is ejected by said loading means, the loading means brings said stabilizing means into the non-operating condition prior to the ejecting movement.

14. A loading apparatus according to claim 13, wherein said stabilizing means moves from a position spaced from the recording medium to a position in close proximity thereto in synchronism with the movement of the recording medium to the loading position, and wherein said stabilizing means is separated from the recording medium in synchronism with the movement of the recording medium to said ejecting position.

15. A loading apparatus according to claim 14, wherein said control means is equipped with a slide lever adapted to operate said loading means so as to move the recording medium to the loading position in synchronism with the insertion of the recording medium into said apparatus for a predetermined distance, and wherein said stabilizing means is moved to said operating position by the movement of said slide lever.

16. A loading apparatus according to claim 15, wherein the operational timing of said conveying means and of said stabilizing means are controlled by a cam section formed on said slide lever.

17. A loading apparatus according to claim 15, further comprising a lock member adapted to lock the movement of said slide lever when the recording medium has not been inserted into said apparatus yet and to release the lock when the recording medium has been inserted.

18. A loading apparatus according to claim 13, wherein said stabilizing means is arranged in a position where it faces said magnetic head through the recording medium, thereby stabilizing the drive condition of the recording medium.

19. A loading apparatus according to claim 18, wherein the apparatus is adapted to record on and reproduce from a disc-shaped magnetic disk.

20. A recording and reproducing apparatus for recording and reproducing from a recording medium comprising: a magnetic head; a stabilizing member arranged in a position where it faces said head through the recording medium and adapted to stabilize the contact between said head and the recording medium; at least three position-adjusting members arranged in mounting sections provided in said apparatus and adapted to control the position of said stabilizing member with respect to said magnetic head; and at least three position-adjusting reference surfaces formed in the end sections of a surface of said stabilizing member which controls the recording medium.

21. A recording and reproducing apparatus according to claim 20, wherein said stabilizing member has two ridges for controlling the recording medium, and wherein said reference surfaces are formed outside an area which is between said ridges.

22. A recording and reproducing apparatus according to claim 21, wherein said stabilizing member is prevented from abutting against said magnetic head by means of a recess groove formed in said stabilizing member at the position opposed to said magnetic head, said ridges consisting of ridges on both sides of said recess groove.

* * * * *

UNITED STATES PATENT AND TRADEMARK OFFICE
CERTIFICATE OF CORRECTION

PATENT NO. : 5,153,792
DATED : October 6, 1992
INVENTOR(S) : Kenji Kawano

It is certified that error appears in the above-indentified patent and that said Letters Patent is hereby corrected as shown below:

On the title page and column 1, line 2. Change "REPORDUCING" to "REPRODUCING"

Col. 4, line 54.   After "will" insert -- also --
Col. 5, line 46.   After "disk" insert remainder of paragraph
Col. 7, line 44.   Change "slided" to -- slid --
Col. 8, line 44.   Change "slided" to -- slid --
Col. 11, line 30.  Change "slided" to -- slid --
Col. 11, line 35.  Change "2" to -- 3 --

Signed and Sealed this

Twelfth Day of October, 1993

Attest:

BRUCE LEHMAN

*Attesting Officer*     *Commissioner of Patents and Trademarks*